United States Patent
Davis et al.

(10) Patent No.: US 7,893,557 B2
(45) Date of Patent: Feb. 22, 2011

(54) METHODS AND SYSTEMS FOR HIGH SPEED DATA COMMUNICATION

(75) Inventors: Terry L. Davis, Issaquah, WA (US); Scott L. Pelton, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 745 days.

(21) Appl. No.: 11/672,603

(22) Filed: Feb. 8, 2007

(65) Prior Publication Data

US 2008/0195259 A1    Aug. 14, 2008

(51) Int. Cl.
*G06F 19/00*    (2006.01)

(52) U.S. Cl. ............................. 307/9.1; 307/3

(58) Field of Classification Search .......... 307/1–3, 307/9.1, 10.1; 340/310.18
See application file for complete search history.

(56) References Cited

U.S. PATENT DOCUMENTS

| | | | | |
|---|---|---|---|---|
| 4,684,825 | A * | 8/1987 | Sachs | ........................ 307/328 |
| 5,929,750 | A | 7/1999 | Brown | |
| 6,965,302 | B2 | 11/2005 | Mollenkopf et al. | |
| 6,965,303 | B2 | 11/2005 | Mollenkopf | |
| 6,980,090 | B2 | 12/2005 | Mollenkopf | |
| 6,980,091 | B2 | 12/2005 | White, II et al. | |
| 6,998,962 | B2 | 2/2006 | Cope et al. | |
| 7,064,654 | B2 | 6/2006 | Berkman et al. | |
| 7,075,414 | B2 | 7/2006 | Giannini et al. | |
| 7,098,773 | B2 | 8/2006 | Berkman | |
| 2001/0009021 | A1 * | 7/2001 | Ellington et al. | ............ 710/129 |
| 2004/0008633 | A1 * | 1/2004 | Youn | ......................... 370/254 |
| 2005/0143868 | A1 * | 6/2005 | Whelan | ........................ 701/1 |
| 2006/0192672 | A1 | 8/2006 | Gidge et al. | |
| 2006/0255930 | A1 | 11/2006 | Berkman | |
| 2008/0217996 | A1 * | 9/2008 | Niss | ........................... 307/9.1 |
| 2008/0300750 | A1 * | 12/2008 | Davis et al. | .................... 701/36 |

FOREIGN PATENT DOCUMENTS

| | | |
|---|---|---|
| GB | 2405513 A | 3/2005 |
| JP | 10062099 A | 3/1998 |
| WO | WO 2005/067142 A1 * | 7/2005 |

OTHER PUBLICATIONS

International Search Report for PCT/US5008/053066; Jun. 3, 2008; 60 pages.

* cited by examiner

*Primary Examiner*—Fritz M Fleming
(74) *Attorney, Agent, or Firm*—Armstrong Teasdale LLP

(57) ABSTRACT

Methods and systems for transmitting power and digital communication are provided. The method includes communicatively coupling a broadband over power line interface unit to a power conductor of a temporary power cable, communicatively coupling the broadband over power line interface unit to a network access point, electrically coupling the power conductor to a vehicle power receptacle, and transmitting network data between the network and the vehicle, and powering the vehicle simultaneously through the power conductor.

19 Claims, 1 Drawing Sheet

METHODS AND SYSTEMS FOR HIGH SPEED DATA COMMUNICATION

BACKGROUND

Embodiments of the disclosure relate generally to methods and systems for data communication and more particularly, to methods and systems for establishing temporary communication using non-traditional communication media for high speed data communication between a ground system and a vehicle.

Known systems onboard vehicles such as commercial aircraft generate considerable amounts of data. For example, engines are monitored at every stage of operation, which results in generation of significant amounts of data. Such monitoring data includes, for example, but not limited to compression ratios, rotation rate (RPM), temperature, and vibration data. A separate electronic digital controller monitor (EDCM) typically monitors each engine. In addition, fuel related data, maintenance, Airplane Health Monitoring (AHM), Operational information, catering data, In-flight Entertainment Equipment (IFE) updates and passenger data like duty free shopping are routinely and typically generated onboard the aircraft. At least some of these systems wirelessly connect to a ground system through a central airplane server and central transceiver.

Currently, when an aircraft arrives at a gate, much of the data is downloaded manually from the aircraft. Specifically, data recording devices are manually coupled to interfaces on the aircraft and the data is collected from the various data generators or log books for forwarding and processing at a back office.

At least some wireless communication systems are used when an aircraft arrives on the ground (sometimes referred to as weight on wheels, WOW). Data may be wirelessly downloaded from the central server onboard the aircraft to the ground system. Data may also be wirelessly uploaded to such central server as well. Such communications frequently occur, for example, using a low speed VHF based or WLAN wireless local area networks with limited bandwidth and high levels of interference.

Demand for additional communication channels and data transfer needs is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of aircraft operational and business processes puts additional demand on communications.

The current solution utilizes a LAN unit (TWLU). However, the usability of the wireless link in an airport environment, where the same frequency spectrum is also being used by perhaps tens or hundreds of other nearby systems is limited. Because the frequency spectrum is shared, the communication bandwidth available to any one aircraft is extremely variable and can easily be a fraction of the capacity found in an unshared radio frequency environment. In addition, the installation of any other new infrastructure in both the airport and the aircraft, such as hardwired network connections to the aircraft, are extremely costly and require additional operational manpower support to the aircraft to physically make this connection. What are needed are methods and systems for establishing an extended bandwidth communication with a vehicle using non-traditional communication media for high speed data communication between a ground system and the vehicle.

SUMMARY

In one embodiment, a method of transmitting power and digital communication includes communicatively coupling a broadband over a power line interface unit to a power conductor of a temporary power cable, communicatively coupling the broadband over a power line interface unit to a network access point, electrically coupling the power conductor to a vehicle power receptacle, and transmitting network data between the network and the vehicle, and powering the vehicle simultaneously through the power conductor.

In another embodiment, a power and digital communication transmission system includes an electrical aircraft umbilical including a supply end, a plug end and a electrical conductor extending therebetween. The plug end is configured to mate with an aircraft such that power is supplied to the aircraft through the electrical conductor from the supply end. The system also includes a first interface device electrically coupled to the supply end and a network access point. The interface device is configured to transmit and receive data carrier signals though the electrical conductor while power is supplied to the aircraft through the electrical conductor and to convert the data carrier signals from and to a predetermined data format on the network. The system further includes a second interface device electrically coupled to the plug end when the umbilical is coupled to the aircraft. The second interface device is configured to transmit and receive the data carrier signals with the first interface device while power is supplied to the aircraft through the electrical conductor.

In yet another embodiment, a method for temporary communication between a service entity and a vehicle includes coupling a temporary service umbilical between the service entity and the vehicle, supplying electrical power to the vehicle through the umbilical, and transmitting high speed digital data between the service entity and the vehicle through the umbilical while supplying electrical power through the umbilical.

DETAILED DESCRIPTION

Figure 1:
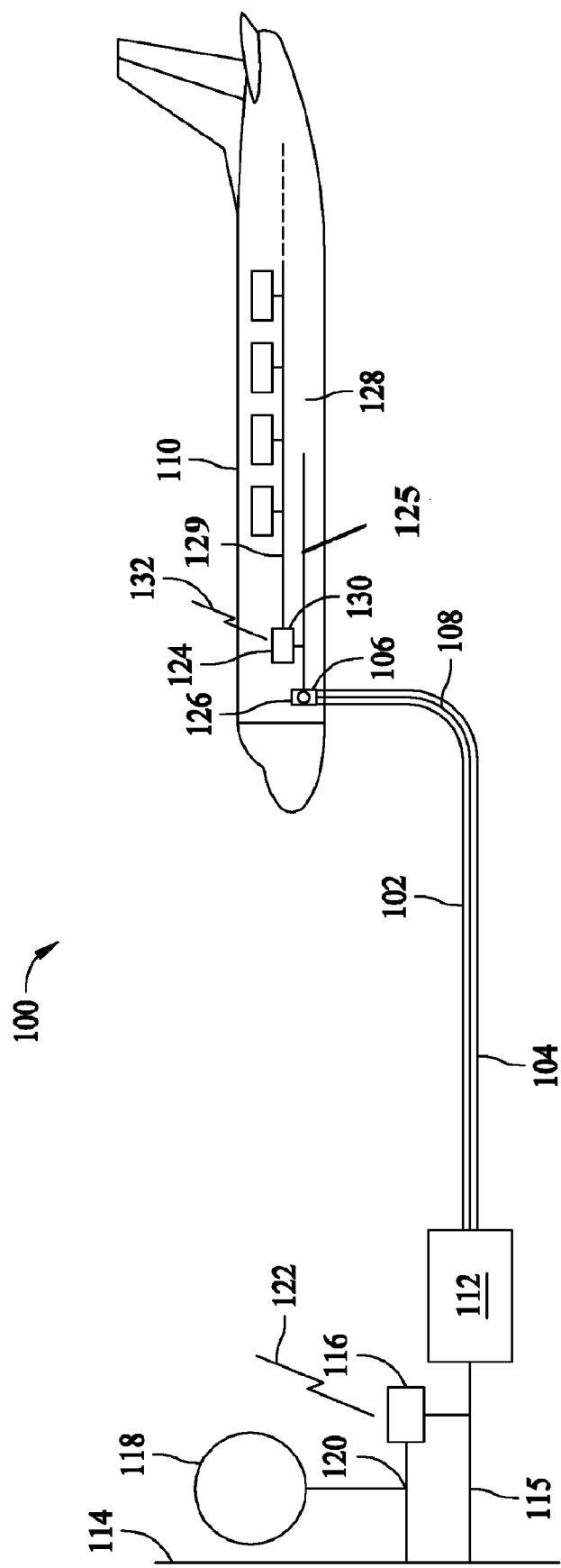
FIG. 1 is a block diagram of a power and digital communication transmission system in accordance with an exemplary embodiment of the disclosure.

FIG. 1 is a block diagram of a power and digital communication transmission system 100 in accordance with an exemplary embodiment of the disclosure. In the exemplary embodiment, power and digital communication transmission system 100 includes an electrical aircraft umbilical 102 comprising a supply end 104, a plug end 106, and an electrical conductor 108 extending therebetween. Plug end 106 is configured to mate with a vehicle such as an aircraft 110 such that electrical power is supplied to aircraft 110 through electrical conductor 108 from supply end 104. In the exemplary embodiment, supply end 104 couples to a ground power system 112 at an airport terminal gate 114. Ground power system 112 is configured to receive electrical power from a power supply through a power supply conduit 115. In other embodiments, ground power system 112 is located on a pier to couple to a boat, barge, or ship (not shown). In still other embodiments, ground power system 112 is positioned at a garage or service facility and is configured to couple to a wheeled vehicle, for example, but not limited to a car, a recreational vehicle (RV), or a train. Additionally, ground power system 112 may comprise another vehicle, such as a space vehicle, undersea or sea surface vehicle wherein one or both vehicles are moving with respect to each other and/or their surroundings while coupled through umbilical 102.

Power and digital communication transmission system 100 also includes a first interface device 116 electrically coupled to supply end 104. In the exemplary embodiment, interface device 116 is electrically coupled to supply end 104 through power supply conduit 115 and ground power system 112. In an alternative embodiment, interface device 116 is electrically coupled to supply end 104 downstream of ground power system 112. In another alternative embodiment, interface device 116 is electrically coupled to electrical conductor 108 internal to ground power system 112. Interface device 116 is also coupled to a network 118 through a wired network access point 120 or a wireless communication link 122.

Power and digital communication transmission system 100 also includes a second interface device 124 electrically coupled to plug end 106 when umbilical 102 is coupled to aircraft 110. In the exemplary embodiment, interface device 124 is electrically coupled to an onboard power bus 125 through plug end 106 through an umbilical plug 126 penetrating a fuselage 128 of aircraft 110. Interface device 124 is also coupled to an onboard network 129 through an onboard wired network access point 130 or an onboard wireless communication link 132.

First interface device 116 is configured to transmit and receive data carrier signals though electrical conductor 108 while power is supplied to aircraft 110 through electrical conductor 108. First interface device 116 is also configured to convert the data carrier signals from and to a predetermined data format on the network. Second interface device 124 is electrically coupled to plug end 106 when umbilical 102 is coupled to aircraft 110. Second interface device 124 is configured to transmit and receive the data carrier signals between first interface device 116 and onboard network 129 while power is supplied to aircraft 110 through electrical conductor 108. In the exemplary embodiment, each of first interface device 116 and second interface device 124 are configured to detect a communication link established through the electrical conductor and report the link to system 100. Interface units 116 and 124 are electrically matched with the characteristics of umbilical 102 including but not limited to wire size, shielding, length, voltage, frequency, and grounding.

In the exemplary embodiment, the predetermined data format is compatible with various network protocols including but not limited to, Internet network protocol, gatelink network protocol, Aeronautical Telecommunications Network (ATN) protocol, and Aircraft Communication Addressing and Reporting System (ACARS) network protocol.

When a communication link through the electrical conductor is established, system 100 is configured to switch communications in progress with a ground system from an established wireless connection to the communication link through electrical conductor 108. Alternatively, system 100 may maintain communications through both the wireless connection and the communication link through electrical conductor 108 simultaneously.

In the exemplary embodiment, high-speed network service to aircraft 110 while parked in a service location such as an airport terminal gate is provided through a conductor of the aircraft ground power umbilical using for example, but not limited to Broadband over Power Line (BPL), X10, or similar technology. Use of this technology permits the airports and airlines to add a simple interface to the aircraft umbilical at the gate and for aircraft manufacturers to provide a matching interface within the aircraft to permit broadband Internet service to the aircraft through an aircraft power link in the umbilical.

Broadband over Power Line (BPL) is a technology that allows Internet data to be transmitted over power lines. (BPL is also sometimes called Power-line Communications or PLC.) Modulated radio frequency signals that include digital signals from the Internet are injected into the power line using, for example, inductive or capacitive coupling. These radio frequency signals are injected into the electrical power conductor at one or more specific points. The radio frequency signals travel along the electrical power conductor to a point of use. Little, if any, modification is necessary to the umbilical to permit transmission of BPL. Shielding in the umbilical substantially minimizes crosstalk and/or interference between the BPL signals and other wireless services. BPL permits higher speed and more reliable Internet and data network services to the aircraft than wireless methods. Using BPL also eliminates the need to couple an additional separate cable to aircraft 110 while combining aircraft electrical power and Internet/data services over the same wire. System 100 uses for example, an approximately 2.0 MHz to approximately 80.0 MHz frequency or X10 similar ranges with the exact frequency range use defined and engineered by the characteristics and shielding of umbilical 102 and the allowable RFI/EMI levels in that particular environment.

In an embodiment, symmetrical hi-broadband BPL is used in umbilical 102 to transmit at communication speeds with aircraft 110 up to two hundred megabits per seconds (200 Mps). This communication speed is more than twice the current maximum wireless throughput and because the BPL link is dedicated to only one aircraft 110 and not shared as wireless is, actual throughput can be from two to ten times the wireless throughput in the same environment. In addition, the throughput is stable and reliable in airport environments, whereas the existing wireless gateline services vary with the amount of RF interference and congestion at each airport.

Although described with respect to an aircraft, embodiments of the disclosure are also applicable to other vehicles such as ships, barges, and boats moored at a dock or pier and also wheeled vehicles parked in a service area.

The above-described methods and systems for transmitting power and digital communication to provide high speed Internet service support directly to the aircraft while at the gate are cost-effective and highly reliable. The methods and systems include integration and use of BPL or X10 similar technology into the aircraft and airport infrastructure to support broadband Internet and data services to the aircraft with minimal infrastructure impacts and cost. The integration of BPL, X10, or similar technology into the airport and aircraft permit using the existing aircraft gate umbilical to provide the aircraft with high-speed and high reliability Internet and data services from the airport gate. Accordingly, the methods and systems facilitate transmitting power and digital communication in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A method for transmitting power and digital communication between a vehicle and a ground system having an established wireless communications link therebetween, said method comprising:
    communicatively coupling a broadband over a power line (BPL) interface unit to a power conductor of a power cable;
    communicatively coupling the BPL interface unit to a network via a network access point;
    electrically coupling the power conductor to a vehicle power receptacle associated with a vehicle;
    causing the vehicle to switch from power generated by the vehicle to power supplied via the vehicle power receptacle;
    establishing a BPL communication link between the vehicle and a ground system;
    switching an in-progress communication occurring between the ground system and the vehicle from the established wireless connection between the ground system and the vehicle to the BPL communication link; and
    transmitting network data between the network and the vehicle via the BPL communication link, and powering the vehicle simultaneously through the power conductor.

2. A method in accordance with claim 1 wherein transmitting network data between the network and the vehicle comprises transmitting network data between the network and the vehicle while the vehicle is stationary.

3. A method in accordance with claim 1 wherein communicatively coupling the broadband over power line interface unit to a network access point comprises communicatively coupling the broadband over power line interface unit to an Internet access point.

4. A method in accordance with claim 1 wherein the vehicle includes a plurality of onboard clients, said method further comprising communicating from at least one of the plurality of clients to the network through the power conductor and through a wireless connection to the network.

5. A method in accordance with claim 1 wherein the vehicle includes a plurality of onboard clients, said method further comprising transmitting data collected by a vehicle engine monitor client to the network through the power conductor.

6. A method in accordance with claim 1 wherein the vehicle includes a plurality of onboard clients, said method further comprising transmitting entertainment system content from an entertainment system client to the network through the power conductor.

7. A method in accordance with claim 1 wherein the vehicle includes a plurality of onboard clients, said method further comprising transmitting vehicle health data from a vehicle health management system client to the network through the power conductor.

8. A method in accordance with claim 1 wherein the vehicle includes a plurality of onboard clients, said method further comprising permitting at least one vehicle occupant to receive commercial Internet services, including email, web access, data transmission, Voice-over-IP, and other services normally associated with the Internet.

9. A power and digital communication transmission system comprising:
    a vehicle electrical umbilical comprising a supply end, a plug end and a electrical conductor extending therebetween, said plug end configured to mate with a vehicle such that power is supplied to the vehicle through the electrical conductor from the supply end;
    a first interface device electrically coupled to the supply end and a network access point, said first interface device configured to:
        transmit and receive data carrier signals though the electrical conductor while power is supplied to the vehicle through the electrical conductor; and
        convert the data carrier signals from and to a predetermined data format on the network; and
    a second interface device electrically coupled to the plug end when the vehicle electrical umbilical is coupled to the vehicle, at least one of said first interface device and said second interface device configured to detect a communication link established through the electrical conductor between the vehicle and the network access point and report the communication link to the system, said second interface device configured to transmit and receive the data carrier signals with said first interface device while power is supplied to the vehicle through the electrical conductor,
    whereupon detection of the communication link and reporting of the link to the system, the system routes a portion of communications with a ground system from an established wireless connection between the ground system and the vehicle to the communication link through the electrical conductor.

10. A system in accordance with claim 9 wherein the predetermined data format is compatible with at least one of an Internet network protocol, a gatelink network protocol, an ATN protocol, and an ACARS network protocol.

11. A system in accordance with claim 9 wherein said second interface device is positioned onboard the vehicle.

12. A system in accordance with claim 9 wherein when the system routes a portion of communications with the ground system from an established wireless connection between the ground system and the vehicle to the communication link, communications between the ground system and vehicle over the established wireless connection are maintained.

13. A method for communication between a service entity and a vehicle capable of generating power, said method comprising:
    coupling a temporary service umbilical between the service entity and the vehicle;
    switching the supply of electrical power to the vehicle to that supplied through the temporary service umbilical;
    switching in-progress communications from an established wireless connection between the service entity and the vehicle, the wireless connection established when the vehicle was generating power, to a communication link between the service entity and the vehicle provided by the temporary service umbilical; and
    transmitting high speed digital data between the service entity and the vehicle through the temporary service umbilical while supplying electrical power through the temporary service umbilical.

14. A method in accordance with claim 13 wherein coupling a temporary service umbilical comprises coupling an electrical power conductor between the service entity and the vehicle.

15. A method in accordance with claim 14 wherein the temporary service umbilical includes an electrical power conductor and wherein transmitting high speed digital data comprises transmitting high speed digital data and electrical power through the electrical power conductor simultaneously.

16. A method in accordance with claim 14 further comprising:
- modulating radio frequency signals with digital signals from the network;
- injecting the radio frequency signals into the electrical power conductor using a broadband over power line interface unit coupled to the electrical power conductor.

17. A method in accordance with claim 13 further comprising coupling a broadband over power line interface unit to a network access point.

18. A method in accordance with claim 13 wherein transmitting high speed digital data between the service entity and the vehicle comprises transmitting high speed digital data between the service entity and the vehicle while the vehicle is stationary.

19. A method in accordance with claim 13 wherein transmitting high speed digital data between the service entity and the vehicle comprises transmitting at least one of electronic digital controller monitor (EDCM) data, fuel related data, maintenance data, Airplane Health Monitoring (AHM) data, operational information, catering data, In-flight Entertainment Equipment (IFE) updates, and passenger data.

* * * * *